United States Patent Office 3,639,320
Patented Feb. 1, 1972

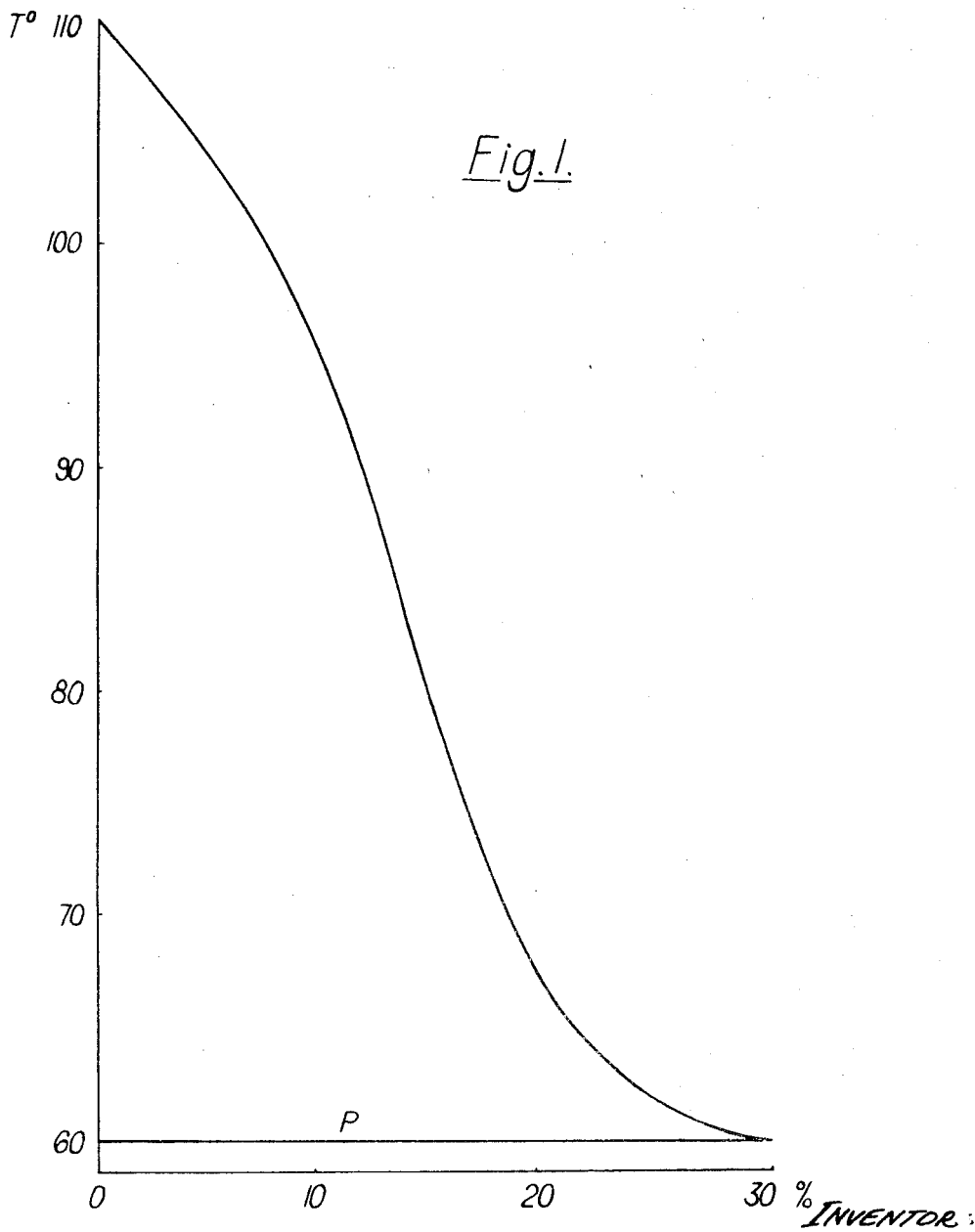

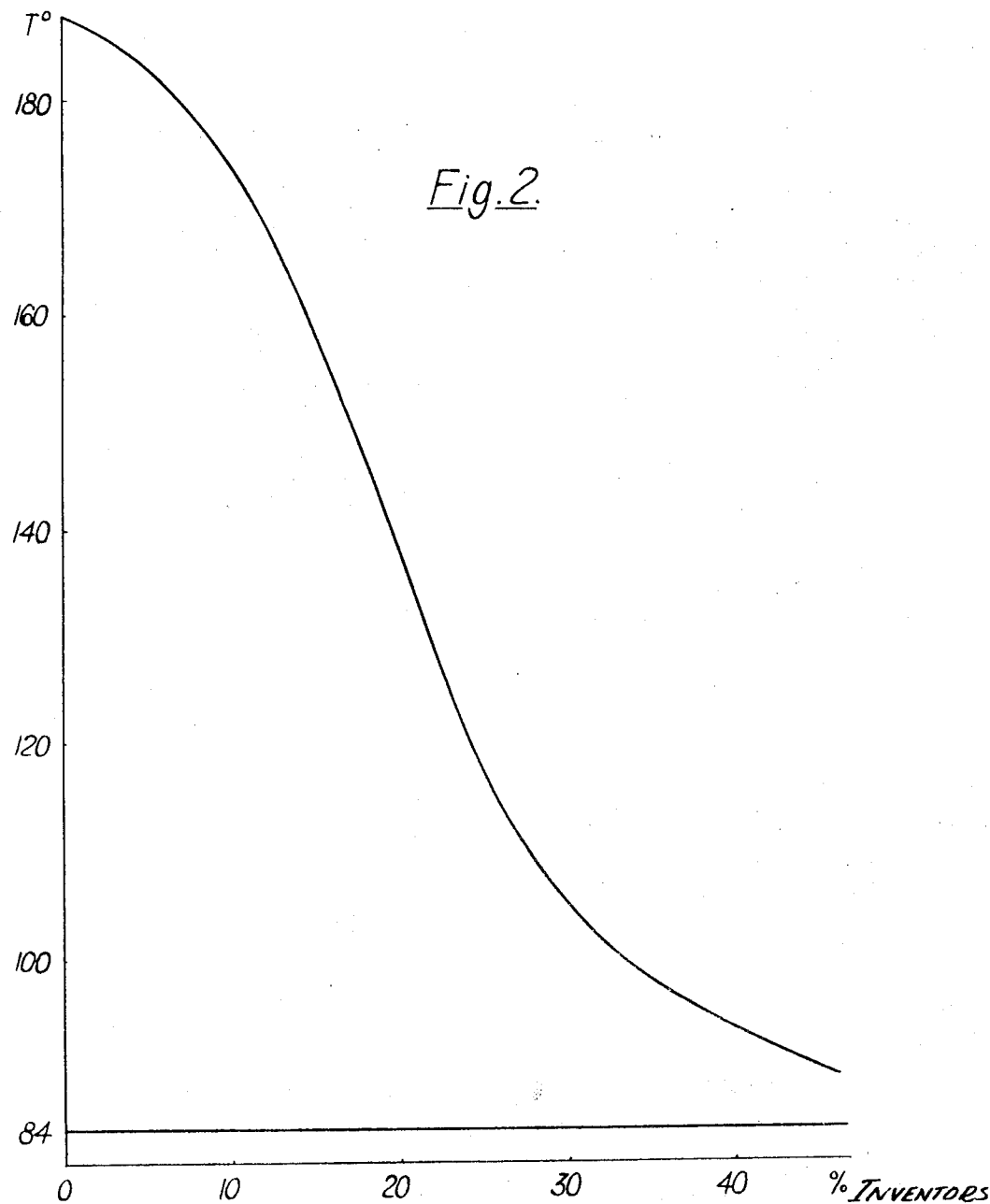

3,639,320
WAX COMPOSITIONS
Alphonse Faure, Claude Gigou, and Robert Mingat, Rhone, and Michel Ruaud, Isere, France, assignors to Rhone-Poulenc S.A., Paris, France
Filed Mar. 18, 1968, Ser. No. 713,583
Claims priority, application France, Mar. 30, 1967, 100,863
Int. Cl. C08c *11/70;* C08f *45/52*
U.S. Cl. 260—28.5                                    6 Claims

ABSTRACT OF THE DISCLOSURE

The invention provides novel wax compositions suitable as hot melt adhesives comprising a minor proportion of a terpolymer of ethylene, vinyl acetate, and a vinyl ester of a higher carboxylic acid and a major proportion of microcrystalline or paraffin wax.

---

The present invention relates to wax compositions which are solid at ambient temperature, are free from solvents and may be applied in the molten state as coatings to various supports such as paper or pasteboard, wood and plastics, and which harden on cooling. Such compositions are often called "hot melt adhesives" or "hot melts." They consist of a mixture of an organic polymer and a paraffin wax and/or a microcrystalline wax.

However, the use of these compositions involves requirements which have not hitherto been fully satisfied. It is essential that the composition intended for the coating or bonding should be completely homogeneous at the time when it is deposited upon the chosen support. Now, this generally means that this composition must be prepared and maintained at a high temperature (140–220° C.) because if it is cooled below a certain limit, called the "cloud point," the polymer is precipitated in the wax, and the composition is rendered unusable. It is therefore advantageous to prepare compositions whose "cloud point" is as low as possible, i.e. in the neighbourhood of the melting point of the wax, because working at high temperatures on the one hand necessitates a considerable supply of heat and on the other hand may cause degradation both of the compositions and of the support.

In fact, it has been pointed out (K. Wright, Rubber & Plastics Age, May 1966, pp. 514–19) that many synthetic polymers hitherto proposed, more particularly polyethylene, polypropylene, polyvinyl acetals, polyamides, polyesters, polyurethanes and ethylcellulose, are not really suitable for the preparation of compositions applicable by melting, owing to their lack of compatibility with wax and their sensitivity to heat.

In U.S. Pat. No. 3,189,573, it is proposed to employ ethylene-vinyl acetate copolymers which, under particular conditions, give homogeneous mixtures with waxes. However, although these compositions may be conveniently employed by the usual extrusion techniques at temperatures slightly above the melting point of the wax, their use as melt coatings necessitates heating at at least 100–175° C. if it is desired to obtain composition which are sufficiently fluid to be used by ordinary installations for hot melt coating.

It is therefore desirable to be able to obtain compositions which, while having such viscosity that they may be employed by the current methods and by the current installations, may be prepared and employed at a temperature which is as close as possible to the melting point of the wax.

The present invention provides compositions comprising (a) 1 to 50% by weight of the total composition of a terpolymer of ethylene, vinyl acetate, and a vinyl ester of a carboxylic acid of 12 to 24 carbon atoms, the weight ratio of ethylene units to vinyl acetate units being from 0.1:1 to 6.5:1 and the proportion of units of the said vinyl ester of a carboxylic acid of 12 to 24 carbon atoms being 0.1 to 50% of the total weight of the terpolymer; and (b) 50 to 99% by weight of the total composition of microcrystalline or paraffin wax. These new compositions have the advantage that they may be employed, for a given viscosity, at a temperature below that required by prior known compositions.

The lowering of the "cloud point" depends on the proportion of the higher vinyl ester in the terpolymer for a constant ratio of wax to terpolymer and a constant ratio of ethylene to vinyl acetate in the terpolymer. For this purpose, FIG. 1 of the accompanying drawings illustrates for a composition containing 4.76% of ethylene-vinyl acetate-vinyl stearate terpolymer (weight ratio of ethylene to vinyl acetate: 2 to 2.4:1) and 95.24% of paraffin wax having a melting point of 60° C., the variation of the "cloud point" as a function of the vinyl stearate content in the terpolymer. In this figure, the vinyl stearate content (percent by weight) of the terpolymer is plotted along the abscissa and the corresponding cloud points (in ° C.) along the ordinate. The straight line (P) indicates the melting point of the paraffin wax employed.

FIG. 2 illustrates the same variation of the cloud point of a composition having the same terpolymer content, but in which the other constituent is a microcrystalline wax having a melting point of 83–84° C. The vinyl stearate content of the terpolymer is plotted along the abscissa, and the corresponding cloud points along the ordinate. The straight line (C) indicates the melting point of the wax employed.

The presence of the higher vinyl ester also reduces the viscosity of the compositions. In addition, it has been found that it is possible, by heating the compositions to temperatures slightly above the "cloud point," to obtain homogeneous mixtures more rapidly than with compositions containing only an ethylene-vinyl acetate copolymer.

The new compositions also have good impermeability to water vapour and elongation at break.

It is essential for the higher vinyl ester to be copolymerised with ethylene and vinyl acetate. Thus, for example, the simple addition both of polyvinyl stearate and of monomeric vinyl stearate to a mixture of wax and ethylene-vinyl acetate copolymer does not bring about any appreciable lowering of the "cloud point."

The new compositions may also contain various adjuvants such as fillers, pigments or other additives whose use is well known in the field of hot melt compositions.

The proportion of terpolymer in the new compositions preferably varies from 10% to 30% by weight. The ratio by weight of ethylene to vinyl acetate in the terpolymer is preferably 1 to 4.6:1.

The higher vinyl esters are preferably ester of saturated aliphatic monocarboxylic acids possessing from 12 to 24 carbon atoms and preferably from 12 to 18 (using pure acids or mixtures of acids obtained from natural glycerides). These esters may be prepared by various methods, notably by transvinylation from lower vinyl esters, for example vinyl acetate.

Although quantities as small as 0.1% of higher vinyl ester in the terpolymer are sufficient to produce a slight lowering of the "cloud point," at least 1% of this ester is generally introduced into the terpolymer. Depending upon the intended applications, and depending upon whether a microcrystalline wax, a paraffin wax or a mixture of the two is employed, the current of this ester in the terpolymer may range up to 50%. The reduced viscosity of the terpolymer, determined at 25° C. in 5 g./l. solution in toluene, is usually varied between 30 and 150 ml./g.

The paraffin waxes which may be used are mixtures of solid linear saturated hydrocarbons obtained in the course of a distillation of petroleum already refined by chemical treatment. The melting point of paraffin waxes is usually between 48° and 62° C.

The microcrystalline waxes which may be used are mixtures of saturated branched-chain aliphatic hydrocarbons obtained in the course of a distillation of crude petroleum. The melting point of microcrystalline waxes generally varies between 60° and 100° C.

The proportion of wax used in the new compositions may vary within very wide limits, depending upon whether the compositions are intended for coating or for bonding, and as a function of the mechanical properties which it is desired to obtain. Generally speaking, the proportion of wax is preferably between 70% and 90% by weight.

The terpolymer of ethylene, vinyl acetate and higher vinyl ester may be prepared by the known methods of producing ethylene-vinyl ester copolymers. Preferably, the ethylene and the vinyl esters are copolymerised in an autoclave—in quantities determined by the desired content of each of these constituents in the terpolymer—in the t-butyl alcohol-water azeotrope and in the presence of an organic compound which produces free radicals. The polymerisation is carried out under a pressure of more than 10 bars and preferably between 50 and 150 bars. The reaction temperature is from −10° to +200° C., and preferably between 40° and 100° C.

The organic compound producing free radicals may be a peroxide or hydroperoxide, such as lauroyl peroxide, benzoyl peroxide dichlorobenzoyl peroxide, acetyl peroxide or succinic acid peroxide, or an azo derivative such as alpha, alpha-azo-bis-isobutyronitrile, or a Redox catalyst. The quantity of catalyst is generally between 0.01% and 2% calculated on the weight of the monomers.

When isolated from the unreacted monomers and then dried, the terpolymer takes the form of fine grains.

The new compositions are prepared by simply mixing, with stirring, the terpolymer and the wax maintained in the molten state by heating. This operation may take place in any appropriate receptacle provided with a stirrer. The temperature to which the mixture must be brought in order to obtain a homogeneous medium varies with its terpolymer content and with the higher vinyl ester content in the terpolymer. Generally speaking, it is sufficient to introduce the terpolymer with stirring into the wax brought to a temperature slightly higher (by a few degrees) than the "cloud point"—the latter having been experimentally determined—and to maintain the stirring and the heating for several tens of minutes to obtain a completely homogeneous mixture. It is also possible to operate at distinctly higher temperatures but, in addition to the aforesaid disadvantages, the dissolution of the terpolymer in the wax and/or paraffin is scarcely accelerated.

The usual methods of coating and bonding with compositions applicable in the molten state are completely suitable for the application of the compositions according to the invention. Generally speaking, the apparatus is composed of a heated receptacle in which the composition is maintained in the molten condition and of a system for depositing a certain quantity of this molten composition upon the support.

The new compositions may be applied as they are, or, as stated above, a portion of the wax may be replaced by fillers, pigments, colouring agents or like materials provided that these compounds do not appreciably modify the characteristics of the compositions.

In some applications such as bonding, a so-called "reinforcing" resin may be mixed with the wax, which may perform the function of a wetting agent, reduce the viscosity of the compositions or improve some of their properties (impermeability, adhesion to the support). Such resins, the melting point of which is below 100° C., include: the esters of colophony, such as the glyceric esters of hydrogenated colophony, the glyceric esters of polymerised colophony, toluene - para - sulphonamide-formaldehyde resins, phenol-formaldehyde resins, indene-coumarone resins, phenol resins or hydrocarbon resins of the terpene type. These resins may themselves contain a plasticiser.

On the other hand, the possibility of working at low temperatures generally renders unnecessary the addition of anti-oxidants.

The new compositions may be employed in the most varied fields: coating of paper, pasteboard, textiles, films and plastic sheets, notably for the preparation of wrappings, to which the coatings of the invention impart, among other properties, impermeability, flexibility and resistance to friction, more especially when the support consists of paper or pasteboard: binding of books, bonding of footwear soles, manufacture of laminates, production of veneers in the furniture industry, and bonding of plastics to metallic supports in the automobile industry.

Moreover, the compositions according to the invention may serve for the coating or bonding of materials which do not withstand high temperatures. When deposited upon any support and cooled, the compositions immediately lose all adhesive power on their surface which is exposed to the air, thus permitting the coating of paper or other materials stored in rolls without danger of uncontrolled adhesion of the whole roll.

The following examples illustrate the invention. The percentages are by weight.

EXAMPLE 1

A series of compositions are prepared by mixing with microcrystalline or paraffin wax on ethylene-vinyl acetate-vinyl stearate terpolymer. In these experiments, only the vinyl stearate content of the terpolymer varies, the operating conditions being otherwise identical. The preparation takes place as follows:

Into a 3.6 litre stainless-steel autoclave provided with a stirrer and previously purged with a current of nitrogen are introduced 155 g. of previously deoxygenated vinyl acetate, alpha, alpha-azo-bis-isobutyronitrile (in a proportion of 0.3% of the weight of the monomers introduced), a predetermined quantity of vinyl stearate, and 835 cc. of previously deoxygenated t-butanol-water azeotrope (88.3% of t-butanol, 11.7% by weight of water). 620 g. of ethylene are introduced into the sealed autoclave, the stirrer is started (150 r.p.m.) and the mixture is heated. At the end of about 25 minutes, the temperature of the mass reaches 60° C. and the pressure 80–85 bars. This temperature is maintained for 24 hours.

After cooling to 25° C., the unreacted ethylene is degassed. Distilled water is introduced into the autoclave and the mixture is stirred for 5 minutes. The terpolymer, which takes the form of fine grains, is separated from the t-butanol-water medium by suction filtering, washed by immersion in acetone to separate the unreacted monomeric vinyl stearate and again suction-filtered and then dried in an oven on plates in vacuo at 35–40° C.

4.5 g. of this terpolymer are then incorporated, with stirring at 170 r.p.m. in a conical reactor, into: $\alpha$/90 g. of paraffin wax melting at 60° C., brought to a temperature of 150° C.; $\beta$/90 g. of microcrystalline wax whose melting point is 83–84° C., brought to a temperature of 200° C. These mixtures are stirred until they are completely homogeneous.

The cloud point of the compositions is determined by turbidimetric measurement, the cooling speed being 1° C. per minute and the initial temperature 150° and 200° C. respectively.

The following table indicates the cloud points of the various compositions prepared as indicated in the foregoing, their terpolymer content being constant (4.76%) and only the vinyl stearate content of the terpolymer being varied.

TABLE 1

| Experiment No. | Quantity of vinyl stearate introduced (g.) | Weight of the polymer collected (g.) | Reduced viscosity of the polymer (ml./g.) | Ratio of ethylene to vinyl acetate in the polymer by weight | Vinyl stearate content of the polymer (percent by weight) | Cloud point of the compositions (degrees) | |
|---|---|---|---|---|---|---|---|
| | | | | | | Paraffin wax | Microcrystalline wax |
| 1 | 1 0 | 334.5 | 115–117 | 2.1:1 | 0 | 110 | 188 |
| 2 | 3.875 | 286 | 99–100 | 2.1:1 | 1.3 | 108.5 | 187.5 |
| 3 | 15.5 | 303 | 94–95 | 2.1:1 | 5.1 | 104 | 182.5 |
| 4 | 23.25 | 304 | 83–84 | 2.1:1 | 6.5 | 102 | 178 |
| 5 | 31 | 311 | 81–82 | 2:1 | 11.2 | 93 | 169.5 |
| 6 | 77.5 | 321 | 59–60 | 2.15:1 | 17 | 74.5 | 151 |
| 7 | 155 | 413 | 49–49 | 2.4:1 | 28.8 | 2 60 | 107 |
| 8 | 232.5 | 563 | 47–47 | 2.4:1 | 38.3 | 2 60 | 95 |
| 9 | 310 | 492 | 41–42 | 2.3:1 | 46.5 | 2 60 | 89 |

1 Reference.
2 Melting temperature of the paraffin wax employed.

EXAMPLE 2

The experiments of Example 1 are repeated under exactly identical conditions and with the same quantities of reactants, except for the vinyl stearate, which is replaced by increasing quantities of vinyl laurate. The cloud point of compositions containing 4.5 g. of the terpolymer thus obtained and 90 g. of the same paraffin wax (melting point 60° C.) and 90 g. of the same microcrystalline wax (melting point 83–84° C.) respectively is measured. These results are set out in the following table.

TABLE 2

| Experiment No. | Quality of vinyl laurate introduced (g.) | Weight of terpolymer collected (g.) | Reduced viscosity of the terpolymer (ml./g.) | Ratio of ethylene to vinyl acetate in the terpolymer by weight | Vinyl laurate content in the terpolymer (percent by weight) | Cloud point of the composition (degrees) | |
|---|---|---|---|---|---|---|---|
| | | | | | | Paraffin wax | Microcrystalline wax |
| 1 | 3.875 | 293 | 96–97 | 2.15:1 | 1.3 | 103.5 | 184 |
| 2 | 23.25 | 324 | 83–84 | 2.2:1 | 5.6 | 99.5 | 175 |
| 3 | 38.75 | 311 | 76–77 | 2.2:1 | 8.7 | 83.5 | 160.5 |

The compositions prepared in accordance with Examples 1 and 2 may be readily employed for the coating or bonding of paper, pasteboard, plastic films or sheets, and wood, using ordinary installations for hot melt coating, at temperatures very close to the cloud point. The presence of an increasing quantity of vinyl stearate or laurate results both in a lowering of the cloud point and in a reduction of the viscosity. It is therefore unnecessary to bring the compositions to a temperature distinctly higher than the cloud point before they can be employed.

EXAMPLE 3

(1) Into a 30 litre stainless-steel autoclave provided with a stirrer and previously purged with a current of nitrogen are charged: 66 g. of alpha,alpha-azo-bis-isobutyronitrile (1% calculated on the weight of monomers introduced); 1470 g. of previously deoxygenated vinyl acetate; 132 g. of vinyl stearate; and 6750 cc. of previously deoxygenated t-butanol-water azeotrope. Into the sealed autoclave 5140 g. of ethylene are introduced. The stirrer is started and the heating begun. At the end of 25 minutes, the temperature of the mass reaches 60° C. and the pressure 85–86 bars. This temperature is maintained for 20 hours. The mass is cooled to 25° C. and the unreacted ethylene is degassed. After washing, suction filtering and drying of the reaction product as described in Example 1, 3960 g. of an ethylenevinyl acetate-vinyl stearate terpolymer are collected having the following characteristics: vinyl stearate content (by weight), 2.5%; weight ratio of ethylene to vinyl acetate, 2.35:1; reduced viscosity of the terpolymer, 110–112 ml./g. 4.5 g. of this product are mixed with 90 g. of microcrystalline wax and with the same quantity of paraffin wax, and the cloud points of these two compositions are 161° C. and 82° C. respectively.

(2) A comparative experiment, carried out under the same conditions but omitting the 132 g. of vinyl stearate, gives the following results: ethylene-vinyl acetate ratio, 2.38:1; reduced viscosity, 112–114 ml./g.; cloud point in microcrystalline wax, 165° C.; and cloud point in paraffin wax, 99° C. If these results are compared with those set out in the table of Example 1, it is found:

(1) That the cloud point may be modified by various factors, notably the ethylene-vinyl acetate ratio (see, for example, experiment 1 of Example 1 and comparative experiment of the present example).

(2) That the presence of vinyl stearate always results in a lowering of the cloud point, other conditions being substantially equal [see parts 1 and 2 of the present example] and that this lowering is more appreciable as the vinyl stearate content in the terpolymer is higher [see experiments 7, 8 and 9 of Example 1, and experiment 1 of the present example].

(a) The polymers prepared in accordance with this example, containing 2.5% and 0% respectively of vinyl stearate, are employed in a composition for coating kraft paper (weight of the paper 90 g./m.$^2$). The composition comprises, in by weight: polymer, 30 parts; paraffin wax (M.P. 54–56° C.), 35 parts; and microcrystalline wax, 35 parts. A layer of this composition is deposited upon the paper in a weight of about 20 g./m.$^2$.

It is found that the permeability of the paper thus coated to water vapour (measured at ambient temperature by loss of weight of a receptacle containing water, sealed by means of the coated sheet and surrounded by a calcium chloride desiccator, the whole being placed in a sealed enclosure), is, at the end of 40 hours, 0.9 g./m.$^2$/h. (for the composition containing vinyl stearate) and 2.5 g./m.$^2$/h. (for the composition without vinyl stearate).

(b) The viscosities of these two compositions, measured successively at 120°, 140°, 160° and 180° C., in centipoises are: with vinyl stearate (2.5% in the terpolymer): 860, 510, 315, 205; without vinyl stearate: 1100, 630, 380, 240.

Thus, the presence of even a small quantity of vinyl stearate in the compositions substantially reduces their viscosity.

(c) Test specimens are moulded from the same compositions (polymer 30 parts; paraffin wax 35 parts; microcrystalline wax 35 parts). To to this, the compositions are subjected to a pressure of 20 kg./cm.$^2$, the temperature changing from 30° to 180° C. in 15 minutes and then from 180° to 30° C. in 10 minutes. The test specimens are kept for one week at 23° C. at 50% RH. These test specimens are tested in accordance with the standard AFNOR T 46 002 (the test specimens are cut to the dimensions corresponding to the model H³). It is found that the breaking strength, measured at 23° C. and at 50% RH, is 57 kg./cm.² for the two types of test specimens while the percentage of elongation at rupture changes from 7% (without stearate) to 17% (with stearate). The flexibility of the compositions according to the invention is a particularly advantageous property, because the material coated with these compositions (more particularly wrappings) can be readily folded without danger of the coating cracking, so that its impermeability is maintained.

EXAMPLE 4

A series of experiments is carried out by mixing, with a constant quantity of paraffin wax having a melting point of 60° C., increasing quantities of an ethylene-vinyl acetate-vinyl stearate terpolymer in which are vinyl stearate content is 1.3% and the weight ratio of ethylene to vinyl acetate is 2.1:1 (the terpolymer of experiment 2 of Example 1).

The determination of the cloud point is effected by turbidimetric measurement under the conditions described in Example 1.

The following results are obtained.

TABLE 3

| Experiment No. | Quantity of paraffin wax (g.) | Quantity of terpolymer (g.) | Percentage of terpolymer in the composition | Cloud point (degrees) |
|---|---|---|---|---|
| 1 | 90 | 4.5 | 4.76 | 108.5 |
| 2 | 90 | 10 | 10 | 104 |
| 3 | 90 | 20 | 18 | 88.5 |

EXAMPLE 5

In an 0.125 litre reactor provided with a stirrer rotating at 170 r.p.m., a series of experiments is carried out by mixing 4.5 g. of various terpolymers with 90 g. of paraffin wax brought to a temperature only a few degrees higher than the cloud point of the mixtures (the cloud point is determined as in the experiments of Example 1), and the time necessary for producing completely homogeneous mixtures (total dissolution) is measured. These results are set out in the following table:

TABLE 4

| Experiment No. | Polymer Ethylene: vinyl acetate ratio | Percent vinyl stearate | Cloud point (degrees) | Temperature to which the paraffin wax is brought (degrees) | Duration of the operation (minutes) |
|---|---|---|---|---|---|
| 1 | 2.1:1 | 5.1 | 104 | 110 | 60 |
| 2 | 2:1 | 11.2 | 93 | 100 | 60 |
| 3 | 2.15:1 | 17 | 74.5 | 80 | 30 |
| 4 | 2.4:1 | 28.8 | 60 | 65 | 30 |
| 5 | 2.1:1 | 0 | 110 | 115 | 90 |

If experiments 1 and 5 are repeated, bringing the paraffin wax to 120° and 125° C. respectively, it is found that it is always necessary to maintain the heating and the stirring for 60 and 90 minutes respectively in order to obtain homogeneous mixtures. The presence of vinyl stearate makes it possible to obtain a homogeneous mixture in a shorter time and at a lower temperature than when the compositions contain no vinyl stearate.

EXAMPLE 6

A series of experiments is carried out by preparing mixtures of paraffin wax and terpolymer (the terpolymer of experiment 3 of Example 1), these mixtures containing 5%, 15%, 25% and 40% of terpolymer respectively. The paraffin wax is maintained at a temperature of 110° C., and after stirring for 30 minutes the quantity of undissolved terpolymer is lower in proportion as the concentration of terpolymer in the mixture is higher. In all cases, the mixture is completely homogeneous at the end of 60 minutes.

A second series of mixtures is prepared which contain the terpolymer of experiment 5 of Example 1 and a paraffin wax. Solutions containing 5%, 10%, 15%, 20%, 30% and 40% respectively of terpolymer are thus prepared, the paraffin wax being heated at 100° C. The same observations apply to these experiments as to the preceding series.

Thus, the ethylene-vinyl acetate-vinyl stearate terpolymers are compatible with paraffin wax in very wide proportions.

We claim:

1. A composition comprising: (a) 1 to 50% by weight of the total composition of a terpolymer of ethylene, vinyl acetate, and a vinyl ester of a saturated, aliphatic monocarboxylic acid of 12 to 18 carbon atoms, the weight ratio of ethylene units to vinyl acetate units being from 0.1:1 to 6.5:1 and the proportion of units of the said vinyl ester of a carboxylic acid of 12 to 24 carbon atoms being 0.1 to 50% of the total weight of the terpolymer; and (b) 50 to 99% by weight of the total composition of microcrystalline or paraffin wax.

2. A composition according to claim 1 wherein the proportion of the said terpolymer is 10 to 30% by weight and the proportion of the said wax is 70 to 90% by weight, the percentages being based on the total weight of the composition.

3. A composition according to claim 1 wherein the weight ratio of ethylene units to vinyl acetate units in the terpolymer is 1:1 to 4.6:1.

4. A composition according to claim 1 in which the reduced viscosity of the terpolymer determined at 25° C. in 5 g./l. solution in toluene, is between 30 and 150 ml./g.

5. Process for coating or bonding which comprises applying to a support a molten composition comprising: (a) 1 to 50% by weight of the total composition of a terpolymer of ethylene, vinyl acetate, and a vinyl ester of a carboxylic acid of 12 to 24 carbon atoms, the weight ratio of ethylene units to vinyl acetate units being from 0.1:1 to 6.5:1 and the proportion of units of the said vinyl ester of a carboxylic acid of 12 to 24 carbon atoms being 0.1 to 50% of the total weight of the terpolymer; and (b) 50 to 99% by weight of the total composition of microcrystalline or paraffin wax, and allowing the said composition to solidify.

6. A composition according to claim 1 wherein the proportion of the said terpolymer is 5 to 40% by weight.

References Cited

UNITED STATES PATENTS

| 3,084,274 | 1/1962 | Buselli | 260—80.81 |
| 3,183,199 | 5/1965 | Alexander | 260—28.5 AV |
| 3,189,573 | 6/1965 | Oken | 260—28.5 AV |
| 3,215,657 | 11/1965 | Beresniewicz et al. | 260—80.81 |
| 3,222,336 | 12/1965 | Heines et al. | 260—28.5 AV |

MORRIS LIEBMAN, Primary Examiner

S. L. FOX, Assistant Examiner

U.S. Cl. X.R.

260—80.81

UNITED STATES PATENT OFFICE
CERTIFICATE OF CORRECTION

Patent No. 3,639,320        Dated February 1, 1972

Inventor(s) Alphonse Faure et al

It is certified that error appears in the above-identified patent and that said Letters Patent are hereby corrected as shown below:

Column 7, line 72 should be deleted and inserted after column 8, line 11.

Signed and sealed this 16th day of April 1974.

(SEAL)
Attest:

EDWARD M. FLETCHER, JR.
Attesting Officer

C. MARSHALL DANN
Commissioner of Patents